(No Model.)
C. R. WILLS.
ANIMAL POKE.
No. 246,932.               Patented Sept. 13, 1881.
— Fig — 1 —
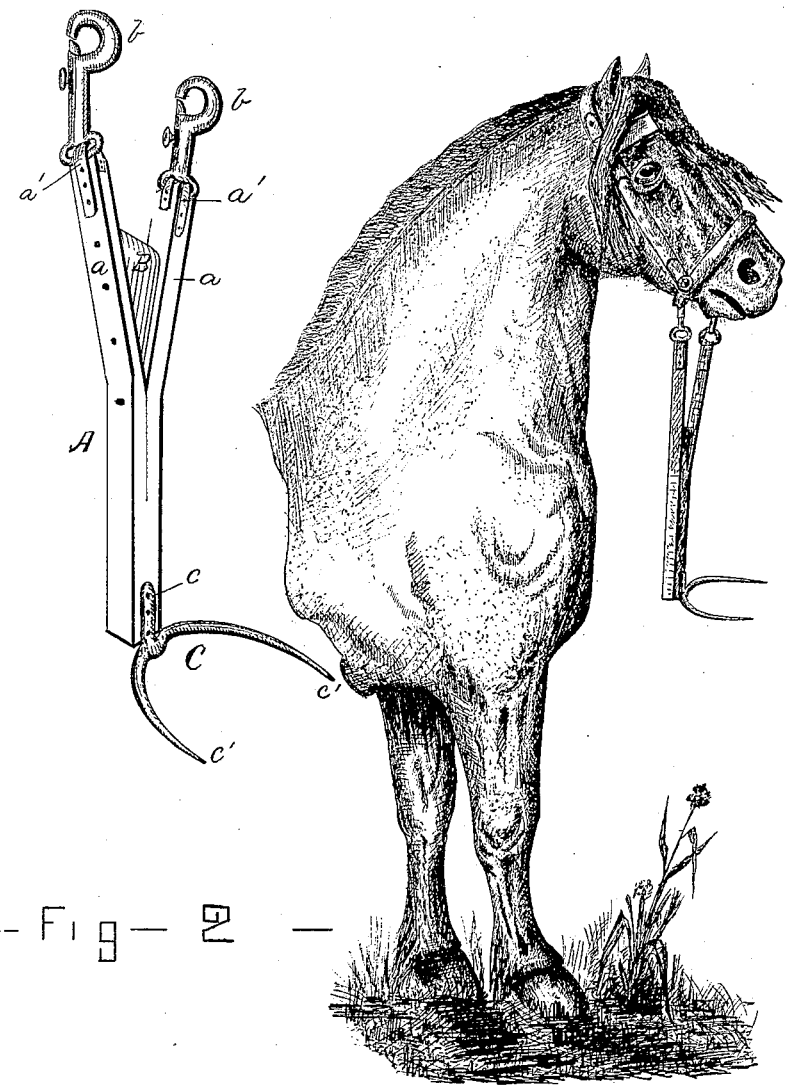
- Fig — 2 —
WITNESSES
James H. Coyne
Wm C. Whiting
INVENTOR
Clifton R. Wills
By Coyne & Elliott
Att'ys.

UNITED STATES PATENT OFFICE.

CLIFTON R. WILLS, OF ST. PAUL, ILLINOIS.

ANIMAL-POKE.

SPECIFICATION forming part of Letters Patent No. 246,932, dated September 13, 1881.

Application filed February 16, 1881. (No model.)

*To all whom it may concern:*

Be it known that I, CLIFTON R. WILLS, a citizen of the United States, residing in St. Paul, county of Fayette and State of Illinois, have invented a certain new and useful Animal-Poke, of which the following is a specification.

My invention relates to animal-pokes provided with one or more prongs to catch on the fence or other obstructions, and adapted to be suspended from the halter underneath the chin of the animal.

The objects of my invention are, first, to avoid the wearing off of the animal's mane or otherwise disfiguring his body; second, to provide means for attaching a poke to an animal so that the animal may not be enabled to throw its weight upon and break the same; third, to prevent an animal from getting its head over a fence or other obstruction, so that it cannot use the weight of the body to push such fence or other obstruction down; and, finally, to provide means of torture without a liability to injure the animal should it attempt to push a fence, &c., over, without interfering with its daily feeding. I attain these objects by devices illustrated in the accompanying drawings, in which—

Figure 1 represents an animal-poke embodying my invention attached to a horse, and Fig. 2 a perspective of the same on an enlarged scale.

Similar letters of reference indicate the same parts in the figures of the drawings.

A represents a staff or stick provided with diverging arms *a a*, formed by splitting the staff, then spreading the arms apart and inserting between them a wedge key or block, held in place by means of nails, bolts, or other suitable means. The staff is thus given the form of a Y, and is provided upon each of the diverging arms with a loop, eye, *a'*, or other suitable device, to provide means for attaching snap-hooks *b b*, which are in turn connected with rings or with the nose-strap of an ordinary halter.

The staff A is of such a length that it will extend downwardly to about or just below the breast of the animal, and is provided at its lower end with a U-shaped or diverging prong, C, extending at a right angle to the staff.

The prong C is provided upon its rear side with an arm, *c*, by means of which it is screwed, bolted, or otherwise secured to the staff, so that its points *c' c'* will extend outwardly from the same and catch upon the rails or boards of the fence or other obstruction should the animal make any attempt to move his head over to push down the same with his breast, as is commonly done.

It is not intended that the points *c' c'* should be sharp enough to render them liable to injure other animals or to pierce the material of which the obstruction is made, but simply to catch upon the obstruction and prevent the animal from moving its head over the same, and afford an obstruction between the fence, &c., and the breast of the animal.

It will be observed that by suspending the poke from the nose-piece of the halter, and thus holding the head of the animal down when the prongs have caught upon the fence, &c., the animal is effectually prevented from jumping the obstruction, even though the head of the animal may extend partially over the same. As the poke is free to swing by reason of its pivotal connection with the halter, it affords no obstruction to the animal while feeding, and it is also prevented from disfiguring the animal by friction, as is the result when suspended from the neck, which is now the common practice.

By suspending the yoke from the nose-piece the animal cannot bring his weight to bear, as is frequently done in the construction just referred to.

Instead of having a U-shaped prong, I may substitute a single straight prong extending at right angles to the neck of the staff without departing from the spirit of my invention.

Having thus described my invention, what I claim, and desire to secure by Letters Patent, is—

The combination, with the staff A, provided with the loops *a' a'*, and means, substantially as described, for suspending the same from the nose-strap of a halter, of the U-shaped prong C, terminating at its forward ends with points *c' c'*, substantially as and for the purpose described.

CLIFTON R. WILLS.

Witnesses:
EDWIN M. ASHCRAFT,
JAMES I. STILLMAN.